United States Patent
Friedrich et al.

(10) Patent No.: US 9,249,832 B2
(45) Date of Patent: Feb. 2, 2016

(54) RING-SHAPED ROLLING BEARING CAGE

(75) Inventors: Peter Friedrich, Auernheim (DE);
Michael Krueger, Schweinfurt (DE);
Steffen Saebsch, Weisendorf (DE);
Heinz Schaefers, Erlangen (DE);
Matthias Fick, Schnaittach (DE);
Manfred Winkler, Aurachtal (DE);
Johannes Enders, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 363 days.

(21) Appl. No.: 13/363,480

(22) Filed: Feb. 1, 2012

(65) Prior Publication Data
US 2012/0195539 A1    Aug. 2, 2012

(30) Foreign Application Priority Data
Feb. 1, 2011   (DE) .......................... 10 2011 003 419

(51) Int. Cl.
*F16C 33/46*    (2006.01)
*F16C 33/50*    (2006.01)

(52) U.S. Cl.
CPC ........... *F16C 33/504* (2013.01); *F16C 2226/74* (2013.01)

(58) Field of Classification Search
CPC ............... F16C 33/50; F16C 33/502
USPC ......... 384/523, 537, 539, 572, 577, 578, 579, 384/570
See application file for complete search history.

(56) References Cited

U.S. PATENT DOCUMENTS

| 939,056 | A | * | 11/1909 | Michaud | 384/578 |
|---|---|---|---|---|---|
| 1,366,312 | A | * | 1/1921 | Danielsson | 384/526 |
| 1,966,775 | A | * | 7/1934 | Weis | 384/578 |
| 4,239,304 | A | * | 12/1980 | Wakunami | 384/573 |
| 4,387,939 | A | * | 6/1983 | Walter et al. | 384/578 |
| 4,830,157 | A | * | 5/1989 | Lederman | 192/45.016 |
| 5,033,876 | A | * | 7/1991 | Kraus | 384/572 |
| 2003/0077017 | A1 | * | 4/2003 | Fugel et al. | 384/578 |
| 2004/0170349 | A1 | * | 9/2004 | Hiramatsu et al. | 384/523 |
| 2006/0008192 | A1 | * | 1/2006 | Sekimoto et al. | 384/523 |
| 2011/0064350 | A1 | * | 3/2011 | Yamakawa et al. | 384/577 |

FOREIGN PATENT DOCUMENTS

| DE | 4124838 A1 | 5/1992 |
|---|---|---|
| DE | 10 2007 048 655 A1 | 2/2008 |
| EP | 0016880 A1 | 10/1980 |

* cited by examiner

*Primary Examiner* — Thomas R. Hannon
(74) *Attorney, Agent, or Firm* — Simpson & Simpson, PLLC

(57) ABSTRACT

A ring-shaped metal rolling bearing cage, which has cage pockets for receiving rolling elements. The cage is formed by a first and a second cage segment. Adjoining ends of the cage segments are connected to one another by suitable connection assemblies. At least one of the assemblies permits a change of the cage diameter when the cage temperature changes. The suitable assembly, on one side, is configured as a joint mechanism and, on another side, as a locking mechanism, and at least one of the assemblies has a lash. A rolling bearing cage configured with the joint mechanism and the locking mechanism can be mounted with low time expenditure in a simple and reliable manner over a shaft, particularly in the case of an idler pinion mourning.

17 Claims, 2 Drawing Sheets

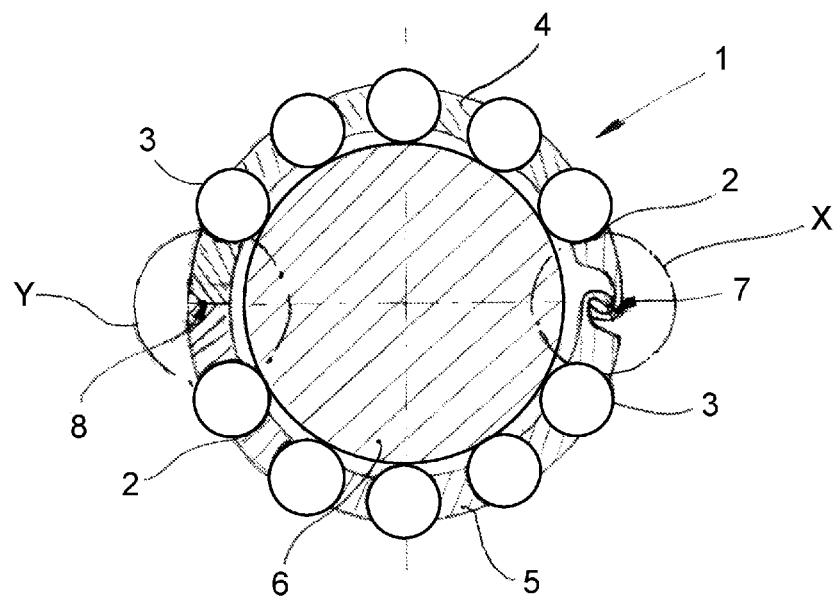
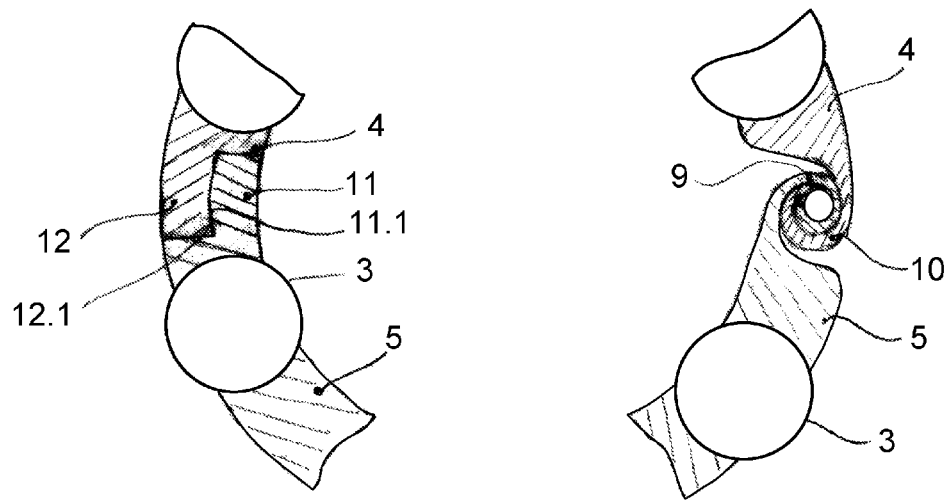
Fig. 1
Fig. 3  Fig. 2

RING-SHAPED ROLLING BEARING CAGE

CROSS-REFERENCE TO RELATED APPLICATIONS

This application claims priority of DE 10 2011 003 419.6 filed Feb. 1, 2011, which is incorporated by reference herein.

FIELD OF THE INVENTION

The invention relates to a ring-shaped metal rolling hearing cage comprising cage pockets for receiving rolling elements. The cage is formed by a first and a second cage segment, adjoining ends of the cage segments are connected to one another by suitable means so that at least one of the means permits a change of the cage diameter when the cage temperature changes.

BACKGROUND OF THE INVENTION

As known, rolling bearing cages serve to retain and guide rolling elements in a rolling bearing and, depending on the purpose of use, they are made either out of metal or out of a plastics material. One purpose of use, for instance, is the so-called idler pinion mounting in which a machine component mounted for rotation through the rolling bearing is either coupled to a shaft or idles loosely about the shaft. Such a machine component is for instance a gearwheel in a mechanical transmission.

EP 0 016 880 A1 discloses a ring-shaped rolling hearing cage that is made up of a plurality of cage segments. Each end of the cage segments comprises a means for connection to an adjoining cage segment. The means are configured so that a pair of connected segments is inseparable at least in the peripheral direction of the rolling bearing cage. Each connection means comprises, in peripheral direction, a lash that permits an enlargement or a diminution of the cage diameter upon a change of temperature.

However, a rolling bearing cage composed of a plurality of cage segments has a drawback because its assembly requires a great amount of time and, in addition, errors can occur during assembly. Because, besides this, the connection means configured on the ends of the cage segments cause an extensive mechanical manufacturing complexity, such a rolling bearing cage is also very expensive to manufacture.

DE 41 24 838 A1 discloses a rolling bearing cage that can be economically manufactured, has a low weight, is supposed to be simple to assemble, and whose shape is variable so that the rolling elements can be displaced in radial direction. In particular, the installed cage is supposed to possess a shape whose variation with rising temperature causes the rolling elements to be displaced. This object is claimed to be achieved, among other things, by the fact that two elastic webs extending at an inclination to the peripheral direction are arranged on one peripheral point of the cage while being connected to each other through a snap-lock device for enabling a stepwise variation of the diameter. In addition, the above-mentioned object is supposed to be achieved through an open cage in which, on one point of the periphery, two cage ends are connected to each other through a snap-lock device for the stepwise variation of the diameter. How the snap-lock device reacts to changes in the operational temperature is not disclosed in DE 41 24 838 A1.

In such solution variants, the influence of temperature on a compulsory, concomitant change in diameter apparently plays a subordinate role because the diameter of the cage can only be varied through mechanical adjustment, in practice, such cages prove to have a drawback because their radial assembly over a shaft is not possible without a notable expenditure of time and a high complexity.

A simpler assembly of the rolling bearing cage compared to the aforesaid configurations is described in DE 10 2007 048 655 A1 in which a plastic cage is made up of a plurality of cage segments. The respective ends of two adjoining cage segments form a connection device which comprises a limited lash between the cage segments in peripheral direction of the cage. Even the use of such a cage for instance for an idler pinion mounting, for example of a gearwheel in a transmission, is accompanied by a high expenditure of time for the assembly and only a comparatively short durability of the rolling bearing cage.

SUMMARY OF THE INVENTION

It is the object of the invention to provide a rolling bearing cage made out of a metallic material which can be mounted with less time expenditure in a simple and reliable manner without an axial movement on a shaft, for example for a so-called idler pinion mounting.

The invention is based on the knowledge that known prior art rolling bearing cages, particularly for an idler pinion mounting, are not easy to mount over a shaft, are not economic in manufacture, and do not possess the degree of functional reliability required in operation.

Accordingly, the invention relates to a metal rolling bearing cage comprising cage pockets for receiving rolling elements. The cage is formed by a first and a second cage segment. Adjoining ends of said cage segments are connected to one another by suitable means, and at least one of the means permits a change of the cage diameter when the cage temperature changes. For achieving its object, the invention proposes that the suitable means is configured on one side as a type of joint mechanism and, on another side, as a type of locking mechanism, and at least one of the suitable means comprises a lash.

The rolling bearing cage can be mounted in a simple manner on a shaft without the need of an axial movement of the cage. In addition, the joint mechanism of the rolling bearing cage enables a diameter variation upon a change of temperature without causing impermissible stresses within the cage.

Advantageous developments of the rolling bearing cage are the subject matter of the independent claims.

According to a first development of the invention, the joint mechanism comprises at least one hinge bushing arranged on the one front end of the first cage segment and at least one hinge bushing arranged on an adjoining front end of the second cage segment. The hinge bushings are made, for example, with or without chip removal. In the assembled state, the two hinge bushings engage into each other and are thus connected by positive engagement to each other. In this way, advantageously, a fast and reliable assembly of the rolling bearing cage is enabled, for example for realizing a so-called idler pinion mounting because, due to the joint mechanism, one of the cage segments can be pivoted radially outward through a pre-determined angular range.

In a further variant of the joint mechanism, the joint mechanism comprises a projection configured on the one front end of the first cage segment and a recess configured in the adjoining front end of the second cage segment. The projection and the recess are both configured over the width of the respective cage segment. The projection possesses the cross-sectional shape of a ball head while the recess has the cross-sectional shape of a ball socket. In this case too, a positive engagement is achieved between the projection and the recess by the fact that the recess engages over the projection to surround at least ⅔ of the cross-sectional shape of the projection. This leads to the formation of an inseparable connection between the two cage segments in peripheral direction, while, at the same time, in this case too, the joint mechanism permits a radially outward pivoting of the one cage segment relative to the other cage segment through a pre-determined angular region.

In order to obtain a most favorable possible pivoting range for mounting the rolling bearing cage, at least one of the front end limiting surfaces running out into the outer peripheral surface of the first or second cage segment is configured as a slope which has an angle α<20° which is relative to the horizontal. Due to the radial pivoting range of the one or the other cage segment which is this enabled, an easy and reliable mounting of the rolling bearing cage over a shaft becomes possible with a low expenditure of time.

According to a further variant, the joint mechanism includes a recess configured in form of a ball socket in each of the adjoining front ends of the first cage segment and of the second cage segment, and a separate, one-piece coupling element. In this example of embodiment, too, the recesses are configured over the width of the respective cage segment. Accordingly, the length of the coupling element is identical to the width of the recesses.

Further, the coupling element possesses a first ball head and a second ball head, a constriction being configured in the transition region between the two ball heads. The constriction is situated in the mounted state of the coupling element, approximately in the separating plane between the first and the second cage segment.

In this case, too, the recesses are configured so that the respective ball head is surrounded over at least ⅔ of its cross-sectional shape by the respective recess. Further, in this example of embodiment, as well, at least one of the front end limiting surfaces running out into the outer peripheral surface of the first or second cage segment is likewise configured as a slope which has an angle α<20° which is relative to the horizontal so that the advantages of the aforesaid example of embodiment are likewise obtained.

According to a further embodiment of the invention, the locking mechanism comprises a tongue-like section on the further end of the first cage segment and a tongue-like section opposing this section and configured on the adjoining end of the second cage segment. A separating line with a curved geometry extends between these tongue-like sections. Each tongue-like section comprises at least one radial elevation and a diametrically opposed radial depression. A substantially straight-lined transition extends between the elevations and the depressions and is situated approximately centrally between the outer periphery and the inner periphery of the cage segments. For permitting an expansion of the rolling bearing cage in the sense of a diameter enlargement upon a change in the normal temperature, a lash is configured between bordering surfaces of the respective elevation and depression that are connected to each other by the straight-lined transition.

In another variant, the locking mechanism comprises only a tongue-like section on the respective ends of each of the cage segments and both these sections overlap each other to form a friction-locked connection. In this variant of embodiment, too, the rolling bearing cage can expand in the sense of a diameter enlargement upon a rise of the operational temperature above the normal temperature. In the course of this expansion, a lash is formed between each of the tongue-like sections and the opposing limiting surface of the respective cage segment, said lash existing in the form a low-lash separating slit at normal temperature.

A further configuration of the locking mechanism can be realized in that the respective opposing ends of the two cage segments, instead of overlapping each other or having a curved geometry, abut flatly against each other and in that, only a low-lash separating slit extending from the outer periphery to the inner periphery of the rolling bearing cage is present.

Further, it may be mentioned that, in another development of the invention; the metallic material used for making the rolling bearing cage is preferably a steel with which a high functional reliability and a long durability of the rolling bearing cage can be achieved.

BRIEF DESCRIPTION OF THE DRAWINGS

The rolling bearing cage configured according to the invention will be described more closely with reference to a number of preferred embodiments of invention and to the appended drawings.

FIG. 1 shows a cross-sectional view of a two-piece rolling bearing cage mounted on a shaft, said cage comprising a joint mechanism and a locking mechanism configured as a suitable means;

FIG. 2 shows an enlarged representation of the detail X of FIG. 1;

FIG. 3 shows an enlarged representation of the detail Y of FIG. 1;

DETAILED DESCRIPTION OF THE DRAWINGS

Figure 5:
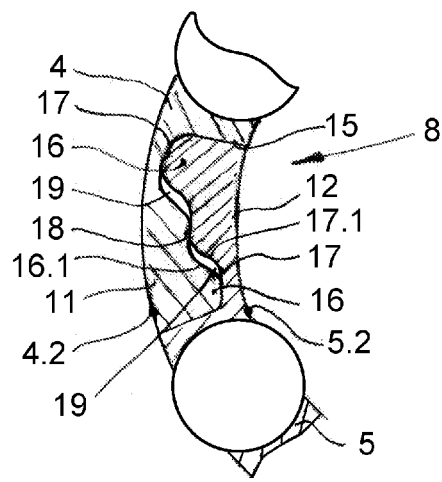
FIG. 5 shows an enlarged representation of an alternative configuration of the detail Y of FIG. 1.

The rolling bearing cage 1, which is made of steel and shown in FIG. 1, comprises a first cage segment 4 and a second cage segment 5. Cage pockets 2 are configured in the cage segments 4, 5 and each of these cage pockets 2 receives a rolling element 3. The inner raceway for the rolling elements 3 is configured in the peripheral surface of a shaft 6. In the present case, the rolling bearing cage 1 serves, for example, for the idler pinion mounting of a gearwheel in a transmission.

As generally well known, one-piece rolling bearing cages made of steel are not mounted radially on a shaft 6 but only in axial direction. The case is different with two-piece cages in which a simple handling of the cage halves during their mounting still remains problematic.

A simple handling of a cage comprising at least two cage segments is achieved by providing a suitable connecting means on every two opposing ends of the cage segments (i.e., on the one end of the first cage segment 4 and on the adjoining end of the second cage segment 5). According to the invention, the suitable connecting means comprises on one side, a joint mechanism 7 whose components can be brought into a positive-engagement connection with each other, and on the other side, a separable locking mechanism 8. Both these suitable connecting means 7, 8 make it possible that by an axial pushing of the first cage segment 4 and the second cage segment 5 into each other, a rolling bearing cage 1 of an almost closed configuration is formed.

As will be elucidated in the following, the components of the joint mechanism 7 and the components of the locking mechanism 8 are connected to each other through positive engagement so that, in case of a change in the cage temperature and/or shaft temperature during operation, the rolling bearing cage 1 can expand in the sense of a diameter enlargement.

A first variant of the joint mechanism 7 shown in FIG. 2 comprises at least one hinge bushing 9, 10 configured on the one end of the first cage segment 4 and at least one hinge bushing 9, 10, configured on the adjoining end of the second cage segment 5. Both these hinge bushings 9, 10 can be made with or without chip removal.

According to FIG. 3, the other end of the cage segment 4 and the opposing end of the cage segment 5 are configured, each one, as a tongue-like section 11 and 12, which sections overlap each other in radial as well as in peripheral direction, and the overlapping surfaces 11.1 and 12.1 form a friction-locked connection.

For forming a closed rolling bearing cage 1, both cage segments 4, 5 are pushed axially into each other so that the two hinge bushings 9, 10 come into engagement with each other and the two tongue-like sections 11, 12 come into surface contact with each other. As viewed in peripheral direction, this leads to the formation of a closed rolling bearing cage 1 whose cage segments 4, 5, for enabling mounting on the shaft 6, are pivotal about an axis of pivoting of the joint mechanism 7 extending parallel to the longitudinal axis of the shaft.

Figure 4:
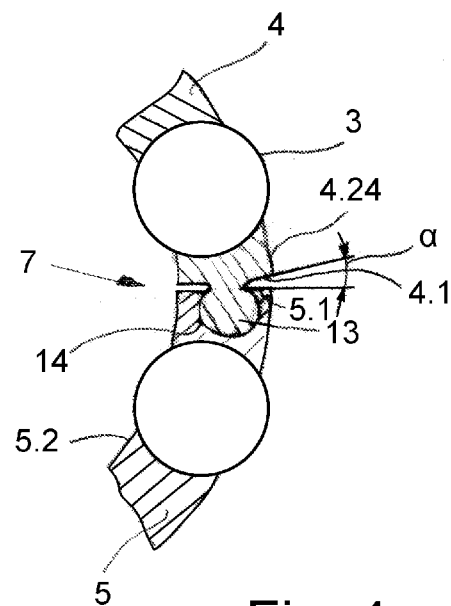
FIG. 4 shows an enlarged representation of an alternative configuration of the detail X of FIG. 1.

In the variant of embodiment according to FIG. 4, the joint mechanism 7 comprises a projection 13 configured in peripheral direction with a cross-sectional shape of a ball head on the one front end of the first cage segment 4 and a recess 14 with a cross-sectional shape of a ball socket configured in the adjoining front end of the second cage segment 5. The ball head 13 and the ball socket 14 extend over the width of the respective cage segment 4, 5. In the assembled state of both cage segments 4, 5, the ball socket 14 surrounds the ball head 13 over at least ⅔ of its cross-section surface in order to thus assure a reliable joint connection. At least one front end limiting surface 4.1 or 5.1 ending on the outer periphery of the cage segments 4 or 5 comprises a slope with an angle α<20° in order to realize a sufficiently large angle of pivot for at least one cage segment during mounting of the rolling bearing cage 1 on a shaft 6.

According to FIG. 5, the locking mechanism 8 of the two cage segments 4, 5 comprises a tongue-like section 11 configured on one end of the first cage segment 4 and a tongue-like section 12 configured on the adjoining end of the second cage segment 5. A separating line 15 with a curved cross-sectional geometry extends between the tongue-like sections 11, 12. This curved cross-sectional geometry is the result of a respective radial elevation 16 and a respective, diametrically opposed depression 17. A substantially straight-lined transition 18 extends between the elevations 16 and the depressions 17, said transition 18 being situated approximately centrally between the outer periphery 4.2 and the inner periphery 5.2 of the cage segments 4, 5. According to the invention, a lash 19 is configured between the bordering surfaces 16.1 and 17.1 of each elevation 16 and depression 17 that are connected through the straight-lined transition 18. This lash 19 permits the expansion of the rolling bearing cage 1 in the sense of a diameter enlargement upon a change of a normal temperature.

Figure 7:
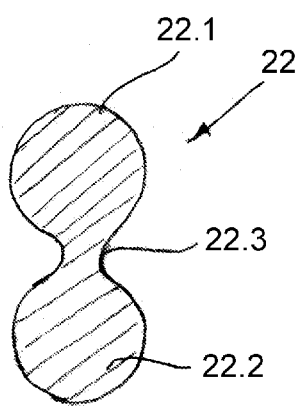
FIG. 7 shows an enlarged representation of a coupling element of FIG. 6 in a cross-sectional view.
Figure 6:
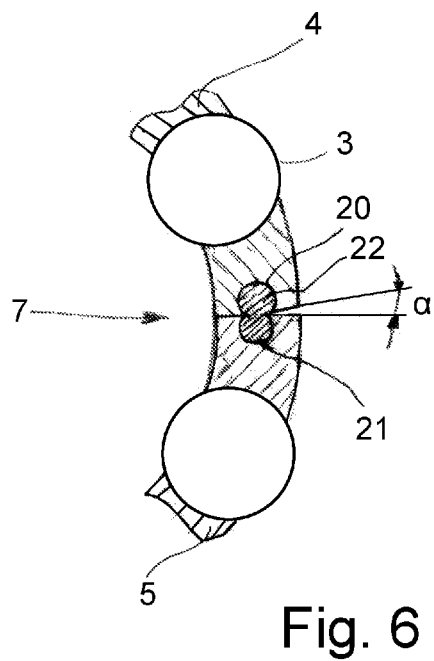
FIG. 6 shows an enlarged representation of a further alternative configuration of the detail X of FIG. 1.

FIG. 6 shows an illustration of a joint mechanism 7 comprising a recess 20, 21 in each of the opposing front ends of the first and the second cage segment 4, 5 and a coupling element 22. The recesses 20, 21 are configured over the width of the respective cage segment 4, 5 and possess the cross-sectional shape of a ball socket. The coupling element 22, which preferably has a one-piece configuration and a longitudinal dimension corresponding to the width of the two cage segments 4, 5 possesses, as shown clearly in FIG. 7, a first ball head 22.1 and a second ball head 22.2, in the region of the transition from the one ball head 22.1 to the other ball head 22.2 is configured a constriction 22.3 into which the open end of the respective recess 20, 21 engages. The configurations of the recesses 20, 21 and the limiting surface 4.1 defining the angle of pivot of the cage segments 4, 5 are identical to the example of embodiment of FIG. 4 so that no closer description is required here.

LIST OF REFERENCE NUMERALS

1 Rolling Bearing Cage
2 Cage Pocket
3 Rolling Element
4 Cage Segment
4.1 Limiting Surface
4.2 Outer Periphery
5 Cage Segment
5.1 Limiting Surface
5.2 Inner Periphery
6 Shaft
7 Joint Mechanism
8 Locking Mechanism
9 Hinge Bushing
10 Hinge Bushing
11 Section
12 Section
13 Projection
14 Recess
16 Elevation
16.1 Surface
17 Depression
17.1 Surface
18 Transition
19 Lash
20 Recess
21 Recess
22 Coupling Element
22.1 Ball Head
22.2 Ball Head
22.3 Constriction

What is claimed:

1. A ring-shaped metal rolling bearing cage, comprising:
a first cage segment having cage pockets;
a second cage segment having cage pockets;
a first connecting means and second connecting means for connecting adjoining ends of the first cage segment and the second cage segment to one another;
wherein at least one of the connecting means permits a change of a diameter of the cage in an installed state of the cage, whereby the cage is allowed to expand when a temperature of the cage changes during operation; and
wherein the first connecting means is a concentric hinge joint mechanism and the second connecting means is a locking mechanism, and the at least one connecting means includes a lash for permitting the change in diameter.

2. The rolling bearing cage according to claim 1, wherein the concentric hinge joint mechanism comprises a first hinge bushing arranged on a front end of the first cage segment and a second hinge bushing arranged on a front end of the second cage segment, which adjoins the front end of the first cage segment, said first hinge bushing and said second hinge bushing being connected to each other by positive engagement in a concentric nesting arrangement.

3. The rolling bearing cage according to claim 1, wherein the joint mechanism comprises a projection formed on a front end of the first cage segment and a recess formed in a front end of the second cage segment, which adjoins the front end of the first cage segment.

4. The rolling bearing cage according to claim 3, wherein the projection has a cross-sectional shape of a ball head and the recess has a cross-sectional shape of a ball socket.

5. The rolling bearing cage according to claim 4, wherein the ball socket surrounds the ball head over at least ⅔ of the cross-sectional shape of the ball head.

6. The rolling bearing cage according to claim 1, wherein the locking mechanism comprises a first tongue section on one end of the first cage segment and a second tongue section on one end of the second cage segment, which adjoins the one end of the first cage segment.

7. The rolling bearing cage according to claim 6, wherein the first tongue section and the second tongue section each comprise at least one radial elevation and one radial depression.

8. The rolling bearing cage according to claim 7, wherein the lash is formed between a surface of the radial elevation and an adjoining surface of the depression, said surfaces being connected through a straight-lined transition.

9. The rolling bearing cage according to claim 1, wherein the concentric hinge joint mechanism and the locking mechanism each extend over a width of the first cage segment and the second cage segment.

10. A ring-shaped metal rolling bearing cage, comprising:
   a first cage segment having cage pockets;
   a second cage segment having cage pockets;
   a first connecting means for connecting respective first circumferential ends of the first and second cage segments to one another; and,
   a second connecting means including:
      a second circumferential end of the first cage segment including a substantially annular portion; and,
      a second circumferential end of the second cage segment including a distal portion wrapped about at least a portion of the substantially annular portion.

11. The ring-shaped metal rolling bearing cage in claim 10, wherein a line orthogonal to an axis of rotation of the ring-shaped metal rolling bearing cage passes through the substantially annular portion and the distal portion.

12. The ring-shaped metal rolling bearing cage in claim 10, wherein a line in a circumferential direction passes through the substantially annular portion and the distal portion.

13. The ring-shaped metal rolling bearing cage in claim 10, wherein in response to a change in a diameter of the cage during operation of the cage the substantially annular portion and the distal portion are arranged to pivot with respect to each other.

14. The ring-shaped metal rolling bearing cage in claim 10, wherein a line in a circumferential direction passes through, in sequence, the first cage segment, a lash gap, the distal portion, and the annular portion.

15. A ring-shaped metal rolling bearing cage, comprising:
   a first cage segment having cage pockets;
   a second cage segment having cage pockets;
   a first connecting means for connecting respective first circumferential ends of the first and second cage segments to one another; and,
   a second connecting means including:
      a second circumferential end of the first cage segment including a first curved portion,
      a second circumferential end of the second cage segment including a second curved portion in contact with the first curved portion, wherein in response to a temperature change of the cage during operation of the cage the first and second curved portions are arranged to pivot with respect to each other to accommodate a change in a diameter of the cage.

16. The ring-shaped metal rolling bearing cage in claim 15, wherein a line orthogonal to an axis of rotation of the ring-shaped metal rolling bearing cage passes through the first and second curved portions.

17. The ring-shaped metal rolling bearing cage in claim 15, wherein a line in a circumferential direction passes through the first and second curved portions.

* * * * *